(12) United States Patent
Yasui (10) Patent No.: US 12,254,596 B2
(45) Date of Patent: Mar. 18, 2025

(54) INFORMATION PROCESSING APPARATUS AND INFORMATION PROCESSING METHOD

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 470 days.

(21) Appl. No.: 17/703,282

(22) Filed: Mar. 24, 2022

(65) Prior Publication Data

US 2022/0318972 A1 Oct. 6, 2022

(30) Foreign Application Priority Data

Mar. 30, 2021 (JP) ................................ 2021-058436

(51) Int. Cl.
G06K 9/00 (2022.01)
G06T 3/40 (2006.01)
G06T 5/50 (2006.01)
G06T 7/254 (2017.01)

(52) U.S. Cl.
CPC .................. *G06T 5/50* (2013.01); *G06T 3/40* (2013.01); *G06T 7/254* (2017.01); *G06T 2207/10016* (2013.01); *G06T 2207/20224* (2013.01); *G06T 2207/30248* (2013.01)

(58) Field of Classification Search
None
See application file for complete search history.

(56) References Cited

U.S. PATENT DOCUMENTS

| | | |
|---|---|---|
| 8,085,308 B2 | 12/2011 | Icho et al. |
| 10,200,649 B2 | 2/2019 | Satoh et al. |
| 10,422,634 B2 | 9/2019 | Watanabe et al. |
| 10,965,861 B2 | 3/2021 | Hayasaka et al. |
| 2010/0007751 A1 | 1/2010 | Icho et al. |
| 2016/0006978 A1 | 1/2016 | Satoh et al. |
| 2019/0268546 A1 | 8/2019 | Hayasaka et al. |

(Continued)

FOREIGN PATENT DOCUMENTS

| | | |
|---|---|---|
| CN | 104995908 A | 10/2015 |
| CN | 109923854 A | 6/2019 |
| JP | 2006-153778 A | 6/2006 |

(Continued)

OTHER PUBLICATIONS

Office Action dated Jan. 6, 2024, issued in counterpart CN Patent Application No. 202210311988.8, with English machine translation. (16 pages).

*Primary Examiner* — Wei Wen Yang
(74) *Attorney, Agent, or Firm* — WHDA, LLP (57) ABSTRACT

An information processing apparatus is provided. The apparatus comprises an image acquisition unit that acquires time-series images by an imaging unit; and a processing unit that performs image processing, generates a plurality of shifted images obtained by shifting a reference image acquired before a target image among the time-series images in an up-down direction by a plurality of types of different shift amounts, and specifies a correction amount by a pitch of the imaging unit on the basis of a difference between each of the plurality of shifted images and the target image.

6 Claims, 6 Drawing Sheets

(56) References Cited

U.S. PATENT DOCUMENTS

2021/0407074 A1* 12/2021 Kobayashi ................ G06T 5/70

FOREIGN PATENT DOCUMENTS

| | | | |
|---|---|---|---|
| JP | 2007-240422 A | 9/2007 | |
| JP | 2009-065283 A | 3/2009 | |
| JP | 2017-20942 A | 1/2017 | |
| WO | 2007/097431 A1 | 8/2007 | |
| WO | WO-2017122552 A1 * | 7/2017 | ............... B60R 1/00 |
| WO | 2019/019172 A1 | 1/2019 | |

* cited by examiner

INFORMATION PROCESSING APPARATUS AND INFORMATION PROCESSING METHOD

CROSS-REFERENCE TO RELATED APPLICATION

This application claims priority to and the benefit of Japanese Patent Application No. 2021-058436 filed on Mar. 30, 2021, the entire disclosure of which is incorporated herein by reference.

BACKGROUND OF THE INVENTION

Field of the Invention

The present invention relates to an information processing apparatus and an information processing method, and more particularly, to an information processing apparatus and an information processing method for specifying a correction amount for correcting a deviation due to a pitch at the time of image capture.

Description of the Related Art

There is a technique for estimating a distance to a target object such as a pedestrian or another vehicle for automated driving or driving assistance of a vehicle. For automated driving and driving assistance, the vehicle attracts attention of the driver according to the estimated distance, or automatically applies the brake without operation by the driver. One of the techniques for estimating the distance is a technique for recognizing an object corresponding to a target object included in an image captured by a camera and estimating the distance to the target object. With this technique, the accuracy of the estimated distance may decrease due to the oscillation of the vehicle around a pitch axis (this may be simply referred to as pitch), and a technique for preventing this decrease in accuracy has been proposed. Japanese Patent Laid-Open No. 2006-153778 describes that in a case where an axial deviation of a pitch angle occurs, an object detection processing region in an entire viewing angle region of each camera on an infrared image is corrected with a position correction amount according to the pitch angle. In addition, Japanese Patent Laid-Open No. 2017-20942 describes, as a technique for estimating a pitch amount, a technique for calculating and integrating a movement amount in a vertical direction of a predetermined region in an image captured with a time difference by an imaging unit provided in a vehicle, and estimating a pitch angle of the vehicle on the basis of an integrated value.

However, Japanese Patent Laid-Open No. 2006-153778 does not disclose a specific technique for specifying the pitch angle of the camera. In addition, Japanese Patent Laid-Open No. 2017-20942 discloses a technique of specifying a region having high correlation in two images and estimating the pitch angle from the movement amount, but according to this, it is necessary to specify a region having high correlation between the two images, and it is considered that the processing load is high.

SUMMARY OF THE INVENTION

The present invention estimates a correction amount with high accuracy by processing with a light load.

The above present invention has the configuration described below.

That is, according to one aspect of the present invention, provided is an information processing apparatus comprising: an image acquisition unit that acquires time-series images by an imaging unit; and a processing unit that performs image processing, wherein the processing unit includes at least one processor and at least one memory having at least one program, the at least one program causes the at least one processor to generate a plurality of shifted images obtained by shifting a reference image acquired before a target image among the time-series images in an up-down direction by a plurality of types of different shift amounts, and specify a correction amount by a pitch of the imaging unit on the basis of a difference between each of the plurality of shifted images and the target image.

According to the present invention, it is possible to estimate a correction amount with high accuracy by processing with a light load.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Configuration of Vehicle Control Apparatus

Figure 1:
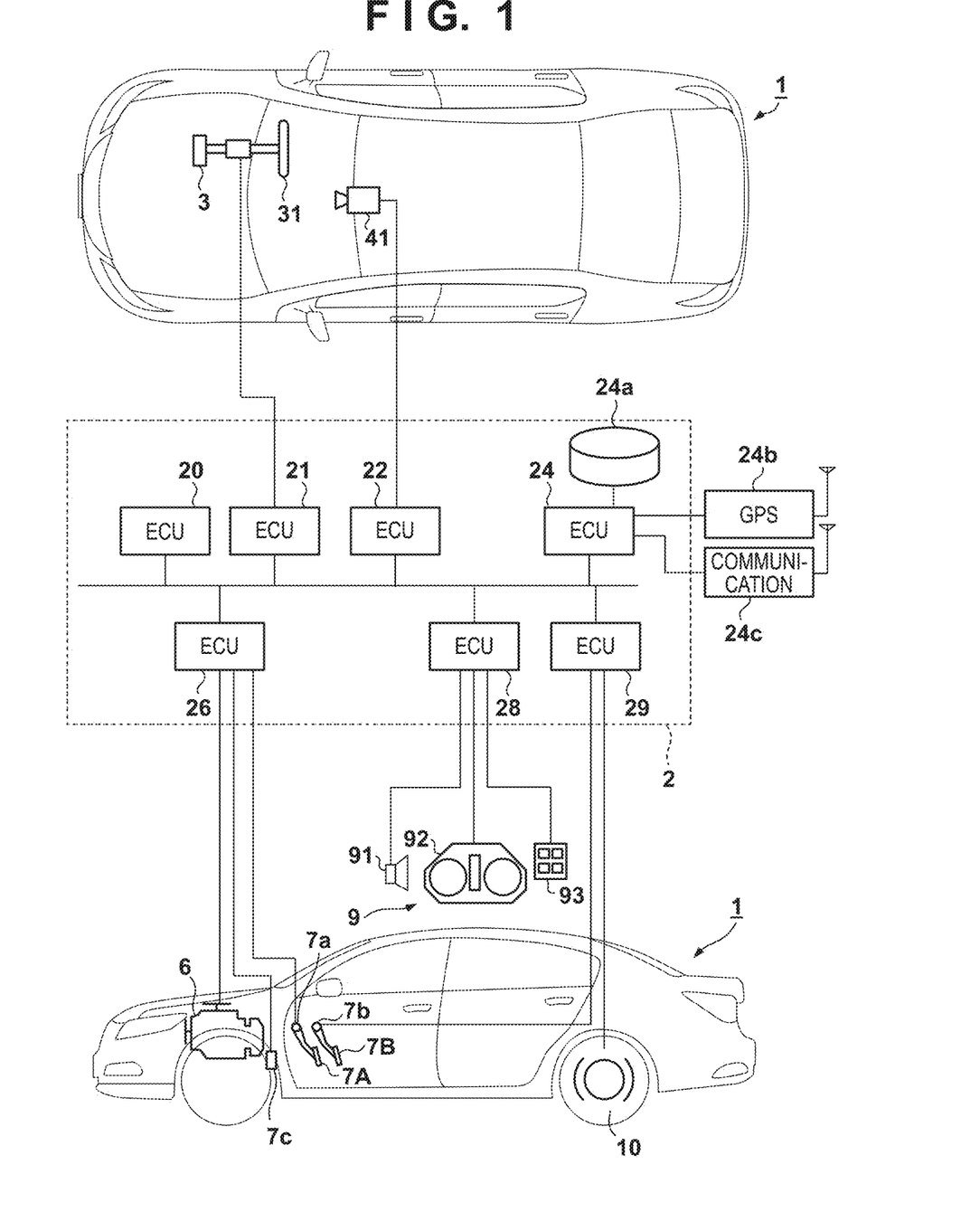
FIG. 1 is an explanatory diagram illustrating a configuration of a vehicle system.

FIG. 1 is a block diagram of a vehicle control apparatus in accordance with an embodiment of the present invention, and the vehicle control apparatus controls a vehicle 1. In FIG. 1, the vehicle 1 is schematically illustrated in a plan view and a side view. The vehicle 1 is, for example, a four-wheeled passenger vehicle of a sedan type. Note that, in the present embodiment, the driving assistance provided by the vehicle control apparatus has limited functions such as emergency braking, adaptive follow-up traveling, and lane keeping assistance, but may have advanced functions such as automated driving when a destination is set.

The control apparatus of FIG. 1 includes a control unit 2. The control unit 2 includes a plurality of electronic control units (ECUs) 20 to 29, which are communicably connected through an in-vehicle network. Each ECU includes a processor represented by a central processing unit (CPU), a storage device such as a semiconductor memory or the like, an interface with an external device, and the like. In the storage device, programs executed by the processor, data used for processing by the processor, and the like are stored. Each ECU may include a plurality of processors, storage devices, interfaces, and the like.

Hereinafter, functions and the like assigned to the ECUs 20 to 29 will be described. Note that the number of ECUs and the functions assigned to the ECUs can be designed as appropriate, and can be subdivided or integrated, when compared with the present embodiment.

The ECU 20 executes control related to automated driving of the vehicle 1. In automated driving, at least one of the steering and acceleration/deceleration of the vehicle 1 is automatically controlled.

The ECU 21 controls an electric power steering apparatus 3. The electric power steering apparatus 3 includes a mechanism for steering front wheels in accordance with a driver's driving operation (steering operation) on a steering wheel 31. In addition, the electric power steering apparatus 3 assists a steering operation, or includes a motor for exerting driving force to conduct automated steering of the front wheels, a sensor for detecting a steering angle, and the like. In a case where the driving state of the vehicle 1 is automated driving, the ECU 21 automatically controls the electric power steering apparatus 3 in response to an instruction from the ECU 20, and controls the traveling direction of the vehicle 1.

The ECU 22 controls a detection unit 41 that detects surrounding situations of the vehicle, and performs information processing of the detection results. The detection unit 41 is a camera that captures an image of a front of the vehicle 1 (hereinafter, referred to as a camera 41, in some cases), and one detection unit is fixedly provided at the front of the roof of the vehicle 1 in the present embodiment. By analyzing the image that has been captured by the camera 41, the ECU 22 can extract a contour of a target object or extract a division line (white line or the like) of a lane on a road. In addition, the distance to the target object in the image can be estimated.

The ECU 24 controls a global positioning system (GPS) sensor 24b and a communication apparatus 24c, and performs information processing on detection results or communication results. The GPS sensor 24b detects the current location of the vehicle 1. The communication apparatus 24c performs wireless communication with a server that provides map information and traffic information and acquires these pieces of information. The ECU 24 is capable of accessing a map information database 24a constructed in the storage device, and the ECU 24 searches for a route or the like from the current location to a destination.

The ECU 26 controls a power plant 6. The power plant 6 is a mechanism that outputs driving force for rotating driving wheels of the vehicle 1, and includes, for example, an engine and a transmission. For example, the ECU 26 controls the output of the engine according to the driving operation (accelerator operation or acceleration operation) of the driver detected by an operation detection sensor 7a provided on an accelerator pedal 7A and switches the gear ratio of the transmission on the basis of information such as the vehicle speed detected by a vehicle wheel speed sensor 7c.

The ECU 28 controls an input and output apparatus 9. The input and output apparatus 9 outputs information to the driver and accepts an input of information from the driver. A voice output apparatus 91 notifies the driver of information by voice. A display apparatus 92 notifies the driver of information by displaying an image. The display apparatus 92 is located in front of a driver's seat, for example, and constitutes an instrument panel or the like. Note that, although the voice and the display have been given as examples here, a notification of information may be given by vibration or light. An input apparatus 93 is a switch group, a touch panel, or the like that is arranged at a position where the driver can operate it and is used to input an instruction to the vehicle 1, and may also include a voice input apparatus.

The ECU 29 controls a brake apparatus 10 and a parking brake (not illustrated). The brake apparatus 10 is, for example, a disc brake apparatus, is provided on each wheel of the vehicle 1, and applies resistance to the rotation of the wheels to decelerate or stop the vehicle 1. The ECU 29 controls actuation of the brake apparatus 10 in response to the driver's driving operation (brake operation) detected by an operation detection sensor 7b provided on a brake pedal 7B, for example. For example, when the distance to the target object detected from the image falls below a predetermined value or when the estimated time to collision falls below a predetermined value, the ECU 29 automatically controls the brake apparatus 10 in response to an instruction from the ECU 20 to control deceleration and/or stop of the vehicle 1. The brake apparatus 10 and the parking brake are also capable of actuating to maintain a stopped state of the vehicle 1. In addition, in a case where the transmission of the power plant 6 is provided with a parking lock mechanism, the parking lock mechanism is also capable of actuating to maintain the stopped state of the vehicle 1.

Image-Based Distance Estimation Function

Figure 2A:
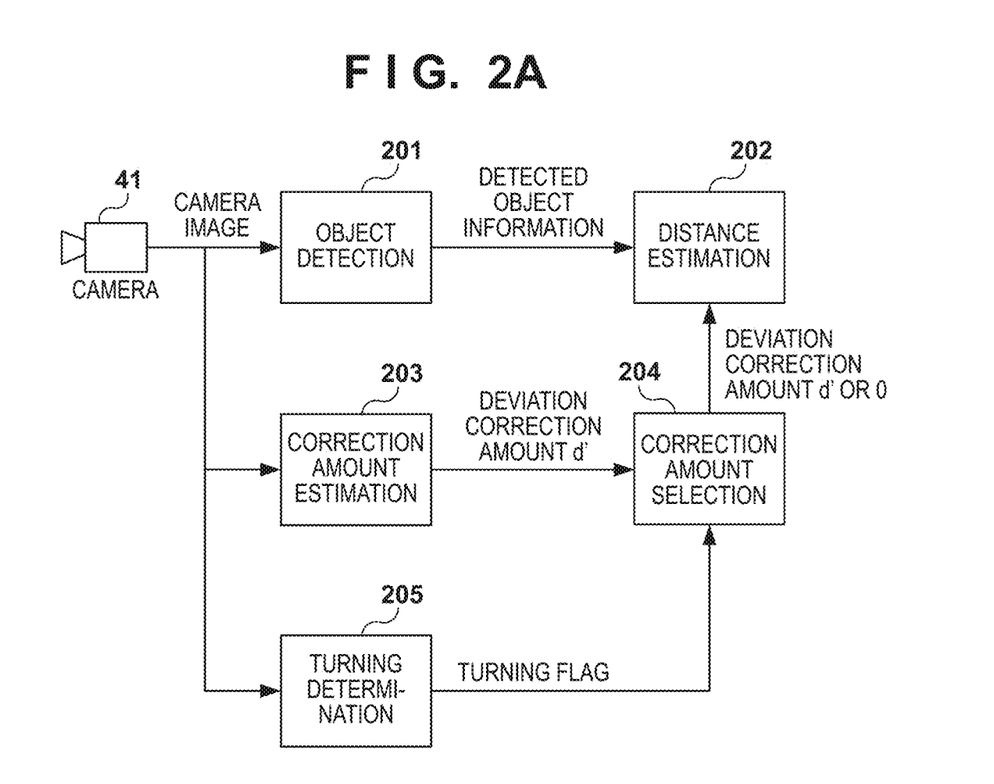
FIG. 2A is a block diagram illustrating a configuration for distance estimation.

FIG. 2A is a block diagram of a distance estimation function realized by the ECU 20. This configuration may be realized by a hardware circuit included in the ECU 20, or may be realized by executing a program recorded in a memory by a CPU included in the hardware circuit. In addition, it may be realized by a combination thereof. The same applies to other ECUs. With any configuration, the ECU 20 or the other ECUs function as an information processing apparatus, an image processing apparatus, or a signal processing apparatus.

The camera 41 is an imaging apparatus such as a monocular camera, and captures a video at a predetermined frame rate, for example. The captured video is composed of frames at predetermined time intervals, and each frame is referred to as an image here. The captured image is sent to an object detection unit 201, a correction amount estimation unit 203, and a turning determination unit 205 at predetermined time intervals. The predetermined time intervals may be a reciprocal of the frame rate or an integral multiple thereof The object detection unit 201 detects an object corresponding to a target object, such as a person or an object, which is a subject, included in the image. Information regarding the detected object is transmitted to a distance estimation unit 202 as detected object information. The correction amount estimation unit 203 estimates a correction amount of a deviation due to the pitch (also referred to as a pitch deviation) on the basis of the latest image and the image immediately before the latest image. Then, in the present embodiment, the estimated correction amount is a correction amount d' of the image, and is input to a correction amount selection unit 204. The turning determination unit 205 determines that the vehicle is turning on the basis of the latest image and the image immediately before the latest image, and inputs the result to the correction amount selection unit 204 as a turning flag.

The correction amount selection unit 204 outputs the deviation correction amount d' when the turning flag indicates that the vehicle is not turning, and outputs 0 as the deviation correction amount when the turning flag indicates that the vehicle is turning. The distance estimation unit 202 estimates the distance to the detected target object included in the image on the basis of the image and the deviation correction amount.

The estimation of the distance by the distance estimation unit 202 may be performed, for example, as described below. A ground height of the camera 41 fixed or adjustably fixed to the vehicle 1 is H0, and a distance L0 from the camera 41 in a capturing direction (optical axis direction) is a reference distance. Then, a position in the height direction in the image corresponding to the height 0 (that is, the ground) and the reference distance L0 in the image captured by the camera 41 is a reference position. The position in the height direction may be determined by, for example, a distance (in units of the number of pixels or the like) from an upper side or a lower side of a captured rectangular image. Conversely, a reference position in the image may be determined and a distance to a position at height 0 (that is, the ground) corresponding to the reference position may be the reference distance. As a specific example, the lower side of the image may be set as the reference position, or a position displaced a predetermined number of pixels from the lower side may be set as the reference position. In addition, in the image obtained by capturing the target object at the reference distance L0, the height per pixel of the target object in the image is k. The term "per pixel" may be a pixel pitch. At this time, a distance L from the camera 41 to the target object corresponding to the object at a height h (the number of pixels) from the reference position in the image can be expressed as $L=L0 \cdot (H0/(H0-h \cdot k))$. When the length from the camera 41 to a front end of the vehicle 1 is Lf, a distance D from the front end of the vehicle to the target object shown at the height k in the image can be estimated as follows: $D=L0 \cdot (H0/(H0-h \cdot k))-Lf$. Note that, in the above formula, it is assumed that the optical axis of the camera 41 is horizontal, but, for example, even when a depression angle is given to the camera 41, it is minute, and may be approximately obtained by the above formula. Of course, this is merely an example, and other methods, for example, a more accurate method considering the depression angle of the camera can be adopted, or other methods can be used. In either method, the distance is estimated on the basis of the position in the height direction of the target object in the image.

Here, in the example described above, a pitch angle variation is not corrected. When the correction is performed, the deviation correction amount d' is added to (or subtracted from) the height of the target object in the image. That is, in the above formula, a corrected distance L' is as follows: $L'=L0 \cdot (H0/(H0-(h+d') \cdot k))$, and a corrected distance D' is as follows: $D'=L0 \cdot (H0/(H0-(h+d') \cdot k))-Lf$.

Figure 2B:
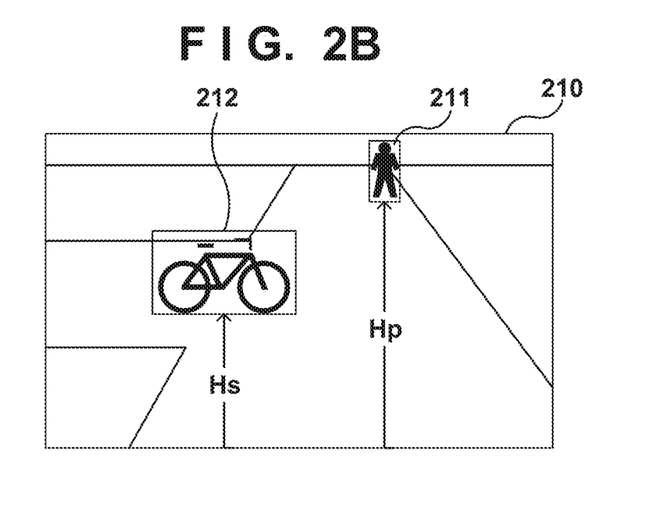
FIG. 2B is a diagram illustrating an example of estimating a distance from a captured image.

FIG. 2B is a diagram illustrating an example of estimating a distance from a captured image. In an image 210, the reference position is the position of the lower side of the image, i.e., a height 0. For example, a target object subjected to machine learning is detected from the image by the object detection unit 201. In FIG. 2B, a pedestrian 211 and a bicycle 212 are detected, and the regions of the detected target objects are specified. This corresponds to the detected object information. A distance estimation unit 202 estimates the distance to each target object from there. According to the above-described method, a distance Ls to the bicycle 212 at a height Hs is $Ls=L0 \cdot (H0/(H0-(Hs+d') \cdot k))-Lf$, where d is the deviation correction amount. Similarly, a distance Lp to the pedestrian 211 at a height Hp is given by $Lp=L0 \cdot (H0/(H0-(Hp+d') \cdot k))-Lf$.

Estimation of Correction Amount of Deviation due to Pitch

Figure 3:
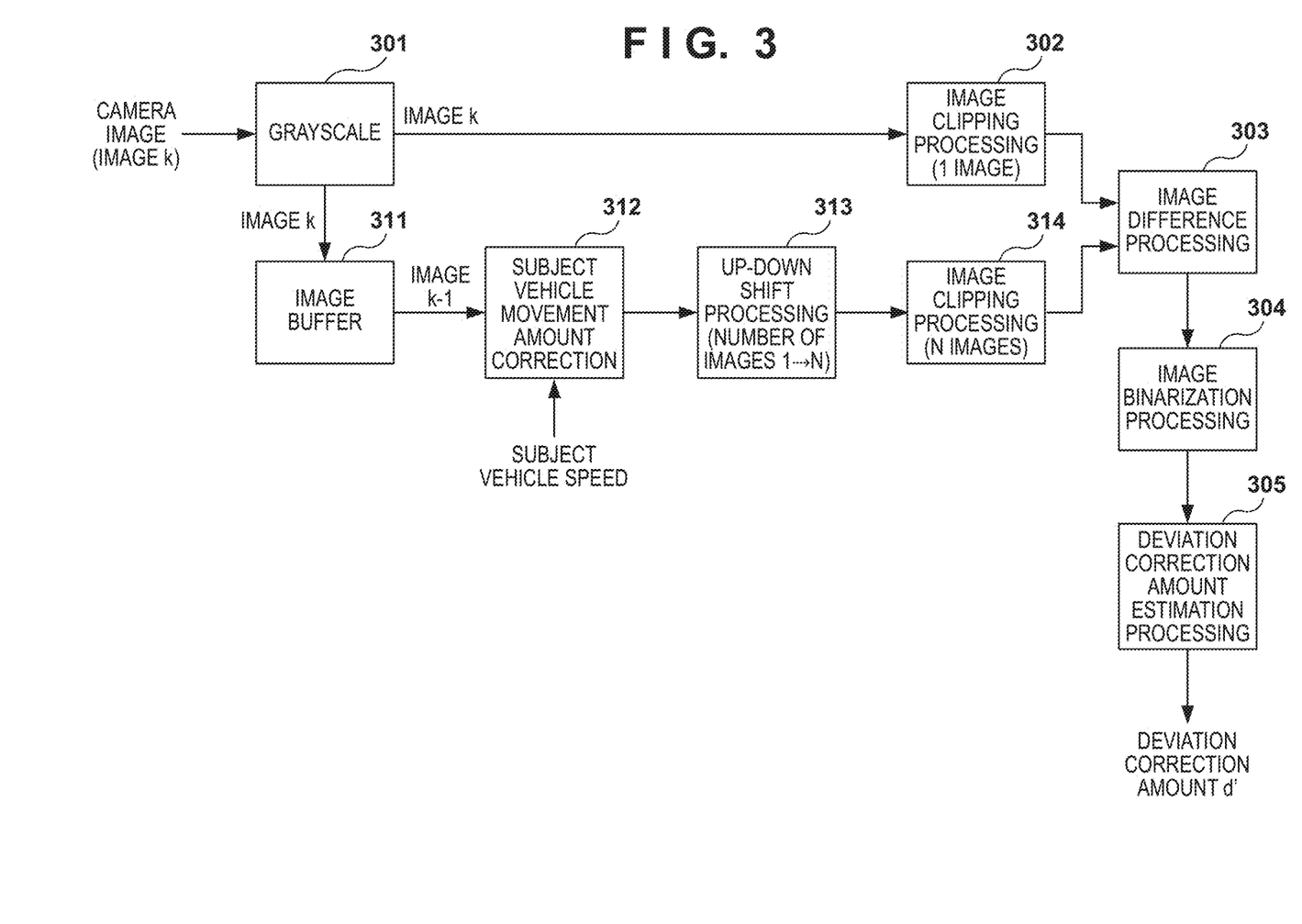
FIG. 3 is a block diagram illustrating a configuration for pitch amount estimation.

FIG. 3 illustrates details of the correction amount estimation unit 203. The image input from the camera 41 is input to a grayscale processing unit 301 and converted into a grayscale image. The image to be processed input here is an image k. Subscript k indicates the order of the images, and an image immediately before the image k is an image k-1. The immediately preceding image is not limited to the frame immediately before the image k captured by the camera 41, and may be a frame having a predetermined number of frames in between. The grayscaled image k is transmitted to an image clipping processing unit 302 and an image buffer 311.

The image buffer 311 is a buffer for holding the image k-1 immediately before the image k. The image k-1 is output from the image buffer 311 and input to a subject vehicle movement amount correction unit 312. The subject vehicle movement amount correction unit 312 corrects the image k-1 on the basis of the vehicle speed and a time difference between the image k and the image k-1 by using the vehicle speed detected by the vehicle wheel speed sensor 7c, the vehicle speed calculated from the position information, and the like as another input.

Figure 4A:
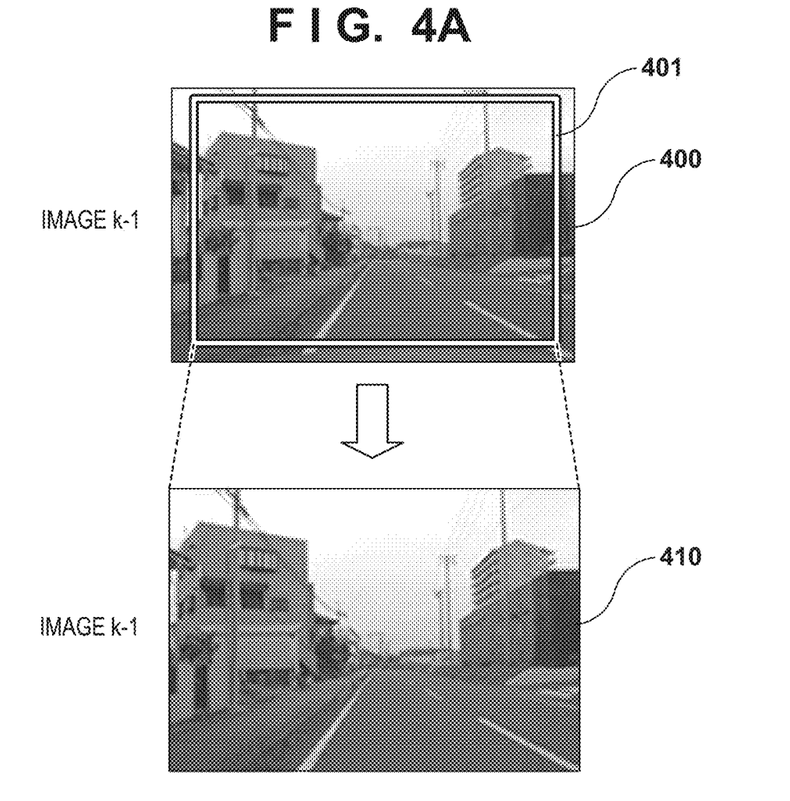
FIG. 4A is a diagram illustrating an example of information processing for pitch amount estimation.
Figure 4B:
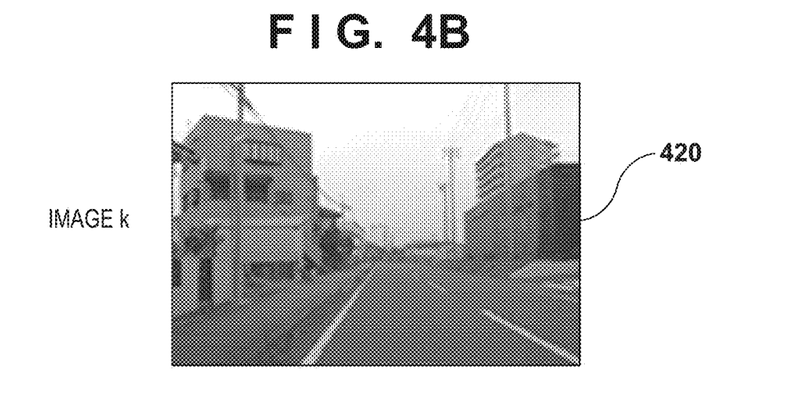
FIG. 4B is a diagram illustrating an example of information processing for pitch amount estimation.

FIGS. 4A and 4B illustrate an example of correction by the subject vehicle movement amount correction unit 312. An image 400 in FIG. 4A is a pre-correction image k-1. An image 420 in FIG. 4B is an image k to be processed. The image 400 is captured at a time earlier than the image 420 by a capture time interval, and is an image zoomed out as compared with the image 420. In order to obtain a difference between the image k-1 and the image k in the subsequent processing, the subject vehicle movement amount correction unit 312 corrects the angle of view of the image k-1 in accordance with the image k. In the example of FIG. 4A, since a region 401 can be specified as the range of capture of the image k from velocity v and time interval ti, when the region 401 is clipped out and enlarged to the original size, an image 410 is obtained. Thus, the angle of view of the image k-1 can be made to coincide with the image k in a pseudo manner.

The image k-1 corrected by the subject vehicle movement amount correction unit 312 is subjected to N types of shift processing by an up-down shift processing unit 313. In the N types of shift processing, for example, s is a constant, a shift amount px(n) for an n-th image k-1(n) is defined as $(n-1) \cdot sf$ (where $n=1, \ldots, N$). Then, it is sufficient if an image k-1(n) is shifted upward or downward according to the shift amount px(n) (in the present example, upward for description). sf is a pixel serving as a unit of shift. Specifically, for example, sf=1 and N=30 may be set. In this case, 30 types of shift amounts of 0, 1,..., 28, and 29 are determined. As a result, N images k-1(1), k-1(2),..., and k-1(N) shifted according to the shift amounts are generated from the image k-1.

The N images k-1 are input to an image clipping processing unit 314. The image clipping processing unit 314 trims, for the N images k-1(n), pixel columns of the number of rows corresponding to a maximum shift amount ((N-1)·sf in this example) from the side (upper side in this example) of the image on the shift direction side. By the shift processing, the pixel columns of n·sf rows from the side on the shift direction side are lost, and the side on the opposite side is filled with an originally absent pixel column (for example, a white pixel column). By the clipping processing, the pixel column of the (N-1)·sf row including the filled white pixel column is trimmed from the opposite side in the shift direction. In the image k-1(N) shifted by (N-1)·sf pixels, which is the maximum shift amount, pixel columns corresponding to (N-1)·sf rows from the side on the shift direction side are lost from the original image k-1. Since this is the maximum value of the number of pixel columns lost from the original image k-1, the other images k-1(n) are also trimmed in the same manner as the image k-1(N). That is, after the shift processing with the shift amount set to (n-1)·sf, the pixel column of the (N-1)·sf row is trimmed from the opposite side in the shift direction. Thus, the size of the images k-1(n) can be consistent.

The image clipping processing unit 302 trims the image k to the same size as the image k-1(n) clipped out by the image clipping processing unit 314. Since it is not clear whether the deviation between the image k and the image k-1 is upward or downward, the shift and the trim similar to those of the image k-1((N-1)/2) shifted by an intermediate shift amount are performed so that the deviation can be detected in either case. Note that the decimal part of (N-1)/2 may be rounded off, for example, rounded up. The image k-1((N-1)/2) is an image obtained by causing the pixel column of ((N-1)/2)·sf row from the upper side of the original image k-1 to be lost by the shift processing and cutting out the pixel column of (N-(N-1)/2)·sf row from the lower side thereof by the clipping processing. Therefore, the image clipping processing unit 302 also trims the pixel column of the ((N-1)/2)·sf row from the upper side of the original image k and the pixel column of the (N-(N-1)/2)·sf row from the lower side. Thus, the size of the image k, which is a target image, can be made to correspond to that of the comparison target image k-1, which is the reference image. In addition, if the pitch amount is 0, the image k can be clipped out such that the image k coincides (or substantially coincides) with the image k-1 ((N-1)/2).

To the image difference processing unit 303, the image k is input from the image clipping processing unit 302 and each of N images k-1(n) is input from the image clipping processing unit 314. The image difference processing unit 303 obtains a difference between the image k and each of the image k-1(n). The image difference processing unit 303 synchronizes the input image k and images k-1(n) as necessary. When the time at which the image k-1 is input to the correction amount estimation unit 203 is used as a reference, it takes time to process the image k-1(n) by the subject vehicle movement amount correction unit 312, the up-down shift processing unit 313, and the image clipping processing unit 314 before the image difference processing unit 303. On the other hand, regarding the image k, a time difference (for example, a frame interval) between the image k-1(n) and the image k and a processing time by the image clipping processing unit 302 are required. In the image difference processing unit 303, either shorter one may be held and synchronized.

The difference is a difference between the values of the corresponding pixels, and the difference for the coincident pixels is 0, and the more the approximation, the smaller the value. An image including such a difference value is also referred to as a difference image. Since the difference image is obtained for each of the N images k-1(n), N difference images are generated (n=1, . . . , N). An image binarization processing unit 304 binarizes the N difference images. The binarization may be performed, for example, by comparing a predetermined threshold value with each pixel value, and setting the pixel value equal or more than the threshold value to 1, and setting the pixel value less than the threshold value to 0. As the threshold value, for example, an intermediate value of the number of gradations of the image k and the image k-1(n) may be used. By binarization, when the difference between the pixel of the image k and the corresponding pixel of the image k-1(n) is large, the pixel value is 1, and when the difference is small, the pixel value is 0.

Finally, the deviation correction amount is estimated (specified) by a deviation correction amount estimation processing unit 305. For this purpose, first, a total pixel value S(n) is obtained for each of the N binarized difference images. The total pixel value S(n) indicates the sum of the number of pixels having a value of 1, that is, the number of pixels having a large difference between the image k and the image k-1(n). An image k-1(n) having a smaller sum S(n) of pixels is an image more similar to the image k. Therefore, in a first method, a shift amount px(n)=(n-1)·sf corresponding to the image k-1(n) having the smallest sum S(n) of pixels is set as a deviation correction amount d as it is. In a second method, the sum S of pixels is regarded as a function of a shift amount px, and a quadratic function that approximates the distribution of S(n) and has px as a variable is determined. Then, px that gives the minimum value of the quadratic function is set as the deviation correction amount d. In the latter method, since the deviation correction amount can be estimated from the shift amount that is not actually attempted, the shift amount can be determined in a larger step. The second method will be described in more detail in the following description of FIG. 5.

Details of Deviation Correction Amount Estimation

Figure 5:
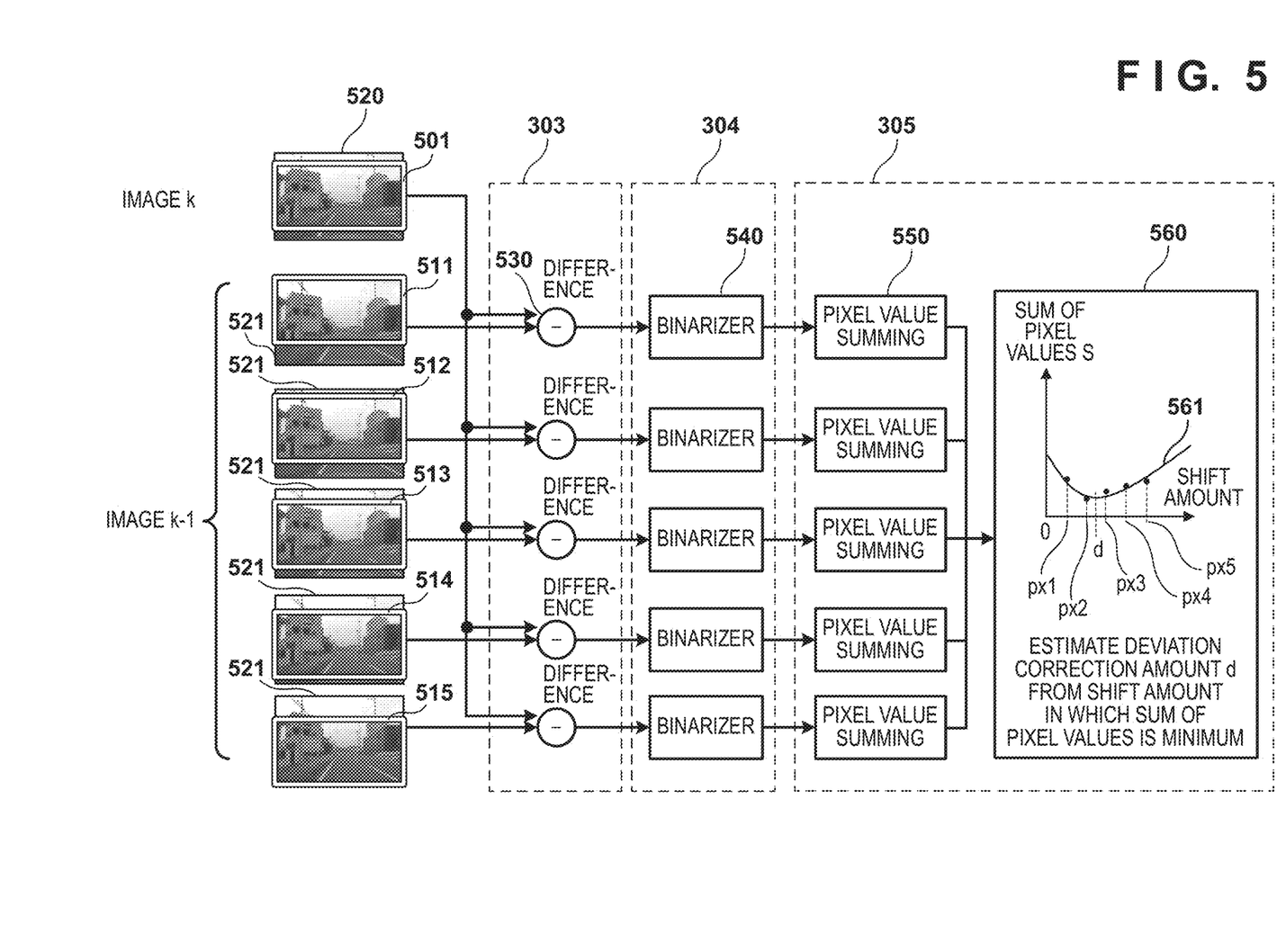
FIG. 5 is a diagram illustrating an example of information processing for pitch amount estimation.

FIG. 5 illustrates a schematic diagram of processing from the image clipping processing units 314 and 302 to the deviation correction amount estimation processing unit 305. Here, an image k-1(1) to an image k-1(5) shifted by five types of shift amounts from the image k-1 are illustrated (that is, N=5). From an image 521, which is the image k-1, images 511 to 515, which are shifted and clipped images k-1(n), are illustrated. For example, the shift amount of the image 511 is 0. The pixel columns of the number of rows corresponding to the maximum shift amount are trimmed from the lower side. In addition, the shift amount of the image 515 is the maximum, and again the pixel columns of the number of rows corresponding to the maximum shift amount are trimmed from the lower side. Here, the upper region of the image 515 is a region truncated by the shift processing, and the lower side of the image 515 is filled with white pixel columns of the number of rows corresponding to the maximum shift amount by the shift processing although not illustrated. In the image 515, the filled region is truncated. The same applies to the other images 512 to 514.

In addition, as described above, an image 501 trimmed in the same manner as the image k-1((N-1)/2) of the intermediate shift amount with respect to the image k-1 is clipped out from an image 520 corresponding to the image k. The image 501 is input to one input of all differentiators 530 included in the image difference processing unit 303, and the images 511 to 515 are input to the other input of the respective differentiators 530. At this point, the difference of the corresponding pixel values is obtained. Note that since the difference is referred to as a measure of the magnitude of the difference, the obtained difference may be an absolute value. Therefore, in a case where there is no normal sign bit in the pixel value, for example, a difference may be calculated by adding a positive sign bit to the pixel value, and as a result, in a case where the sign bit is inverted, a complement of 2(10*b*) may be obtained to obtain an absolute value.

The difference image including the difference between the corresponding pixels is input from the differentiator 530 to a binarizer 540 included in an image binarization processing unit 304. In the binarizer 540, each difference image is binarized with a predetermined threshold value. The threshold value may be, for example, ½ of the number of gradations, or may be smaller, about ¼ or ⅛. Of course, an even smaller value may be used.

The binarized difference image is input to a pixel summing unit 550 of the deviation correction amount estimation processing unit 305, and the sum of the pixel values of the respective difference images is obtained. This sum indicates the number of pixels having a difference equal to or more than the threshold value in corresponding pixel values between the image k (also referred to as a target image) and the image k-1(n). In other words, ideally, when they completely coincide, the pixel values of the difference image are all 0, and the sum is 0. The shift amount of the image k-1(n) at that time can be determined as the deviation amount due to the pitch. In the present embodiment, the shift amount of the image k-1 in which the sum of the pixel values of the difference image is minimum is determined as the deviation amount.

Therefore, the sum value output from the pixel summing unit 550 is input to an estimation unit 560 together with the shift amount px(n)(=(n-1)·sf) of the corresponding image k-1(n). Hereinafter, a method in which the estimation unit 560 determines an approximate quadratic function S_hat(n) from these values and estimates the deviation amount therefrom (the above-described second method) will be described.

Determination of Approximate Quadratic Function

S_hat(n) is given by the formula described below.

$$S\_hat(n)=a(n-1)Px^2(n)+b(n-1)Px(n)+c(n-1) \quad (1)$$

$$=\Phi^T(n-1)\zeta(n)$$

Here, n corresponds to n of the image k-1(n), and is referred to as an image number (n=1 to N).

Here, model parameters a, b, and c of S_hat expressed by Formula (1) are calculated by the formula described below. The formula described below is performed N times, which is the number of shifted images, within the control cycle. First, the following two matrices are defined.

$$\Phi^T(n)=[a(n)b(n)c(n)] \quad (2)$$

$$\zeta^T(n)=[Px^2(n)Px(n)1] \quad (3)$$

That is, Formula (1) is given as a product of the matrix $\Phi^T(n)$ of Formula (2) and the matrix $\zeta(n)$ expressed by being transposed by Formula (3). $\Phi(n)$ is a coefficient matrix to be obtained, and the matrix $\zeta(n)$ is a matrix of constants determined by the shift amount px(n). In addition, an error e(n) is defined by Formula (4).

$$e(n)=S(n)-S\_hat(n) \quad (4)$$

$$=S(n)-\Phi^T(n-1)\zeta(n)$$

Here, S(n) is the sum of difference pixel values corresponding to the image k-1(n). That is, an error e(n) indicates an error between an observed value and a value given by an approximation formula.

Here, the coefficient matrix $\Phi(n)$ is defined by the formula described below.

$$\Phi(n)=\lambda\Phi(n-1)+KP(n)e(n) \quad (5)$$

$$KP(n)=P\zeta(n)/(1+\zeta^T(n)P\zeta(n)) \quad (6)$$

In formula (5), $\Phi(n-1)$ is a coefficient matrix for the image number (n-1). $\lambda$ is a weight to be multiplied. e(n) is an error indicated by Formula 4. KP(n) is as defined in Formula (6), and in Formula (6), P is an adaptive gain (P>0).

The above procedure is repeated from n=1 to n=N to determine $\Phi^T(N)$ =[a(N)b(N)c(N)]. Since this is the coefficient matrix of the quadratic function to be obtained, a value d(N) of px that gives the minimum value (=local minimum value) of S_hat(N)=a(N)Px²+b(N)Px+c(N) is as follows:

$$d(N)=-b(N)/(2a(N)) \quad (7)$$

Here, an initial value of $\Phi(n)$ may be zero. Alternatively, it may be the calculated value of a previous control cycle. That is, $\Phi(N)$ obtained when a previous deviation amount is estimated may be used as an initial value at the time of the next deviation amount estimation. When the calculated value of the previous control cycle is used as the initial value, high frequency fluctuations between control cycles can be removed, and inappropriate high frequency fluctuations can be removed from the pitch correction value.

In addition, for example, the coefficient of a quadratic function S_hat2 may be determined by a least squares method. In this case, the coefficients from the quadratic term to the constant term are set as a, b, and c, and the coefficients are determined such that the sum of square deviations of the sum of the pixel values of the difference image actually obtained and the sum of the pixel values derived from the quadratic function S_hat2 is minimized. Thus, for example, a, b, and c that satisfy $$2\Sigma\{S(n)-(a\cdot px(n)^2+b\cdot px(n)+c)\}(-px(n)^2)=0$$

$$2\Sigma\{S(n)-(a\cdot px(n)^2+b\cdot px(n)+c)\}(-px(n))=0$$

$$2\Sigma\{S(n)-(a\cdot px(n)^2+b\cdot px(n)+c)\}(-1)=0$$

can be determined as coefficients of the quadratic function S_hat2. Here, $\Sigma$ represents a sum of n=1 to N. When the coefficient is determined, the shift amount d that gives the minimum value can be determined as d=−b/(2*a*). As described above, the correction amount estimation unit 203 can estimate the deviation correction amount d on the basis of the image k-1 and the image k.

The deviation correction amount determined in the manner described above uses the image k-1 as the reference image. In practice, the image k-1 may also be deviated in the up-down direction by the pitch with respect to an image k-2. The same applies to earlier images, and there is a possibility that deviations are accumulated. Therefore, in principle, the deviation correction amount d should be determined by accumulating past values. However, when the deviations are accumulated, errors are also accumulated, and the accuracy of estimation may be rather lowered. Therefore, the deviation correction amount estimation processing unit 305 multiplies the accumulated past estimated value by a coefficient (referred to as a forgetting coefficient) $\lambda$ that satisfies 0<$\lambda$<1 and accumulates the result. For example, the estimated value of the latest deviation correction amount to be obtained is d', the estimated value of the deviation correction amount obtained only from the difference between the image k and the image k-1 is d, and the estimated value of the immediately preceding deviation correction amount obtained from the image k-1 as the target image is $d'_{k-1}$. The forgetting coefficient is $\lambda$, and $$d'=d+\lambda d'_{k-1}$$

is an output of the correction amount estimation unit 203. By setting the forgetting coefficient, accumulation of errors can be prevented, and a decrease in estimation accuracy due to the error accumulation can be prevented.

Turning Determination Processing

Figure 6A:
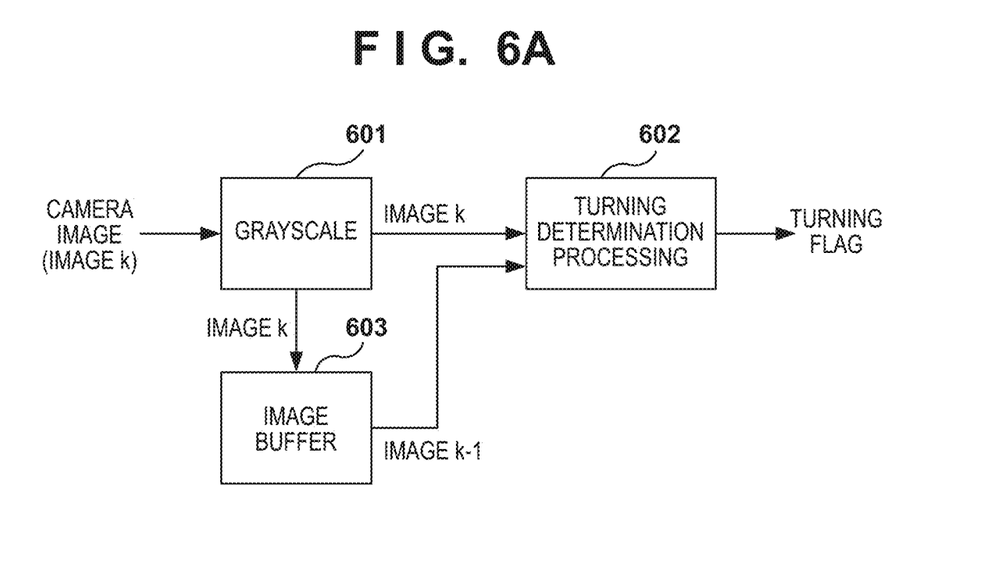
FIG. 6A is a block diagram illustrating a configuration for turning determination.

Next, turning determination by the turning determination unit 205 will be described. FIG. 6A schematically illustrates the turning determination unit 205. When the image k is input, the image k is grayscaled by a grayscale processing unit 601 and delivered to a turning determination processing unit 602 and an image buffer 603. The image k and the image k-1 are synchronously input to the turning determination processing unit 602, and turning determination processing is performed. In the turning determination processing, a difference image is generated by obtaining a difference between corresponding pixels of two images, and the sum of pixel values of the difference image is compared with a threshold value. As a result of the comparison, when the sum is larger than the threshold value (or equal to or more than the threshold value), it is determined that there is a possibility that the vehicle is turning. Then, when it is determined that there is a possibility of continuous turning with respect to the two images k and k+1, a turning flag is set. When it is not determined that the vehicle is turning, the turning flag is reset.

In this example, since neither the enlargement correction of the image k-1 nor the binarization of the difference image is performed, the sum of the difference image becomes a large value to some extent even in a case where the vehicle is not turning, and thus, a large value may be selected for the threshold value. In addition, alternatively, similarly to the estimation of the deviation correction amount, the image k-1 may be enlarged and corrected as illustrated in FIG. 4A. Alternatively, the difference image may be binarized to obtain the sum of the binarized pixel values.

As described above, the correction amount selection unit 204 inputs 0 as the deviation correction amount when the turning flag is set, and inputs the correction amount d' input from the correction amount estimation unit 203 to the distance estimation unit 202 when the turning flag is not set. The distance estimation unit 202 estimates the distance L' from the camera 41 to the target object at the height h in the image as L'=L0·(H0/(H0−(h+d')·k)).

With the above configuration, it is possible to estimate the distance to the target object after correcting the deviation in the up-down direction of the image due to the pitch of the vehicle. The estimation accuracy can be further improved by correcting the deviation due to the pitch. In addition, it is possible to further improve the accuracy by limitedly accumulating the past estimation results using the forgetting coefficient. In addition, the estimation accuracy can be further improved by correcting the difference in angle of view between the reference image k-1 and the target image k on the basis of the capture interval and the velocity. Furthermore, in a case where it is determined that the vehicle is turning, it is possible to prevent erroneous estimation associated with turning by setting the deviation correction amount to 0.

Second Embodiment

In the second embodiment, the deviation correction amount d' is used for shifting the image k instead of being used for estimation of the distance by the correction amount estimation unit 203. In this case, the distance estimation unit 202 shifts the image k in the up-down direction by the deviation correction amount d' instead of calculating the distance L' using the deviation correction amount d'. For example, when the sign of the deviation correction amount d' is positive, the shift is performed in the upward direction, and when the sign is negative, the shift is performed in the downward direction. The distance L' is obtained as L'=L0·(H0/(H0−h'·k)). Here, h' represents the height from the reference position of the target object in the corrected image k. Even in the above manner, the same effects as those of the first embodiment are obtained.

Third Embodiment

In the third embodiment, the correction amount estimation unit 203 outputs pitch correction amount $\theta$ instead of the deviation correction amount d'. The distance estimation unit 202 corrects the deviation of the estimated distance due to pitching using the pitch correction amount $\theta$.

Figure 6B:
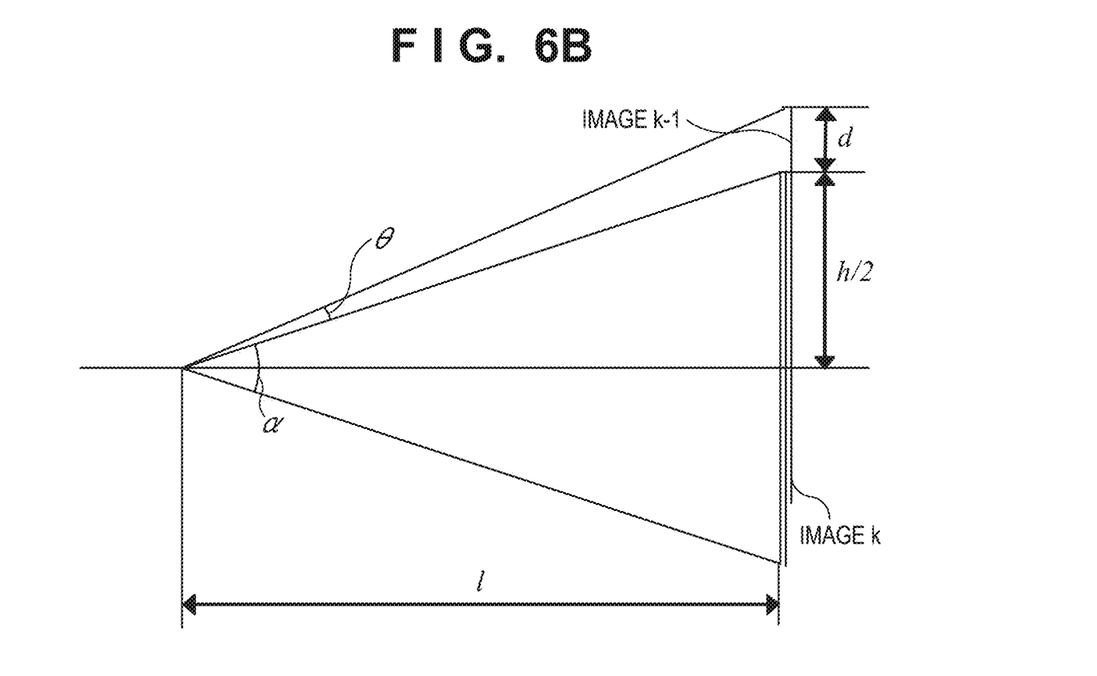
FIG. 6B is a schematic diagram for estimating a pitch correction amount.

FIG. 6B illustrates a schematic diagram for estimating a pitch correction amount. When the deviation correction amount d is determined only from the image k and the image k-1 as in the first embodiment, the pitch correction amount $\theta$ is determined on the basis of the deviation correction amount d. As illustrated in FIG. 6B, the pitch correction amount is $\theta$, the deviation amount (deviation correction amount) in the up-down direction of the image k with respect to the image k-1 is d, and the angle of view is $\alpha$. The other amounts are given as illustrated. In this case, $\theta$ is $$\tan((\alpha/\theta)+\theta)=((h/2)+d)/1.$$

Here, furthermore, $$\tan(\alpha/2)=(h/2)/1$$

and $$1=(h/2)/\tan(\alpha/2).$$

Thus, $$\tan((\alpha/2)+\theta)=((h/2)+d)/((h/2)/\tan(\alpha/2)).$$

h may be, for example, the number of pixels. In this formula, since those other than $\theta$ are constants, $\theta$ can be determined using an addition theorem or the like.

The thus-determined $\theta$ may also be accumulated after being multiplied by the forgetting coefficient $\alpha$ in the same manner as in the first embodiment to obtain the pitch correction amount $\theta'=\theta+\lambda\theta'_{k-1}$. Furthermore, a pitch correction amount $\theta'$ is input to the distance estimation unit 202 via the correction amount selection unit 204, and is referred to in the distance estimation processing. Here, the deviation correction amount d' is obtained by reversely executing the procedure described above, and may be used for calculating the estimated distance in the same manner as in the first embodiment or the second embodiment. Thus, the same effects as those of the first embodiment are obtained.

In addition, the estimated pitch correction amount can be used not only for distance estimation but also for other functions. For example, the irradiation direction of a headlight can be rotated with a phase opposite to the pitch correction amount, or in the case of having a radar, the irradiation direction can be shifted with a phase opposite to the pitch correction amount. Thus, appropriate illumination and setting of an appropriate radar search range can be performed.

Summary of Embodiments

The above-described embodiments at least disclose the information processing apparatus described below.

1. The information processing apparatus of the aforementioned embodiment includes:
an image acquisition unit that acquires time-series images by an imaging unit; and
a processing unit that performs image processing, in which
the processing unit
generates a plurality of shifted images obtained by shifting a reference image acquired before a target image among the time-series images in an up-down direction by a plurality of types of different shift amounts, and specifies a correction amount by a pitch of the imaging unit on the basis of a difference between each of the plurality of shifted images and the target image. With this configuration, it is possible to estimate the correction amount with high accuracy with a lighter load as compared with the prior art.

2. The information processing apparatus of the aforementioned embodiment, in which
the processing unit enlarges the reference image on the basis of a time difference between capture of the reference image and capture of the target image and a moving velocity of the imaging unit, and estimates the correction amount using the enlarged reference image. With this configuration, it is possible to eliminate the influence on the estimation result due to the movement of the imaging unit.

3. The information processing apparatus of the aforementioned embodiment, in which
the processing unit obtains the number of corresponding pixels that are different between images as a difference between each of the plurality of shifted images and the target image, determines a quadratic function that gives the number of pixels using a shift amount of each of the plurality of shifted images as a variable on the basis of a correlation between the shift amount and the number of pixels, and estimates the correction amount on the basis of a shift amount that gives a minimum value of the quadratic function.

With this configuration, interpolation can be performed by a quadratic function, and a correction amount with higher accuracy can be estimated.

4. The information processing apparatus of the aforementioned embodiment, in which
the processing unit further integrates correction amounts obtained on the basis of a plurality of time-series target images to specify the correction amounts, and multiplies a correction amount specified for a past target image by a forgetting coefficient at the time of integration.

With this configuration, accumulation of errors can be suppressed, and a correction amount with higher accuracy can be estimated.

5. The information processing apparatus of the aforementioned embodiment, in which
the processing unit determines movement of the imaging unit in a lateral direction on the basis of a difference between the target image and the reference image, and sets the correction amount to 0 when the movement in the lateral direction is determined.

With this configuration, it is possible to prevent the movement in the lateral direction from being erroneously recognized as the deviation due to the pitch.

6. The information processing apparatus of the aforementioned embodiment, in which
the processing unit specifies a distance to a target object corresponding to an object included in the target image on the basis of a height to the object in the target image and the correction amount.

With this configuration, the estimation of the distance in which the deviation due to the pitch is corrected can be realized.

7. The information processing apparatus of the aforementioned embodiment, in which
the imaging unit is fixed to a vehicle.

Thus, the distance from a pitching vehicle to a target object can be estimated with high accuracy.

8. The information processing method of the aforementioned embodiment is an information processing method by an information processing apparatus including an image acquisition unit and a processing unit that performs image processing, the method including:
acquiring, by the image acquisition unit, time-series images by an imaging unit; and
generating, by the processing unit, a plurality of shifted images obtained by shifting a reference image acquired before a target image among the time-series images in an up-down direction by a plurality of types of different shift amounts, and specifying a correction amount by a pitch of the imaging unit on the basis of a difference between each of the plurality of shifted images and the target image.

With this configuration, it is possible to provide an information processing method capable of estimating a correction amount with high accuracy with a lighter load as compared with the prior art.

The invention is not limited to the foregoing embodiments, and various variations/changes are possible within the spirit of the invention.

What is claimed is:

1. An information processing apparatus comprising:
a camera that is fixed to a vehicle and acquires time-series images
at least one processor and at least one memory having at least one program,
the at least one program causes the at least one processor to
generate a plurality of shifted images obtained by shifting a reference image acquired before a target image among the time-series images in an up-down direction by a plurality of types of different shift amounts, and specify a correction amount by a pitch of the camera on the basis of a difference between each of the plurality of shifted images and the target image
wherein the at least one program causes the at least one processor to
enlarge the reference image on the basis of a time difference between capture of the reference image and capture of the target image and a moving velocity of the camera so that the angle of view of the target image region included in the reference image matches the angle of view of the target image.

2. The information processing apparatus according to claim 1, wherein
the at least one program causes the at least one processor to obtain the number of corresponding pixels that are different between images as a difference between each of the plurality of shifted images and the target image, determine a quadratic function that gives the number of pixels using a shift amount of each of the plurality of shifted images as a variable on the basis of a correlation between the shift amount and the number of pixels, and specify the correction amount on the basis of a shift amount that gives a minimum value of the quadratic function.

3. The information processing apparatus according to claim 1, wherein
the at least one program further causes the at least one processor to integrate correction amounts obtained on the basis of a plurality of time-series target images to specify the correction amounts, and multiply a correction amount specified for a past target image by a forgetting coefficient at a time of integration.

4. The information processing apparatus according to claim 1, wherein
the at least one program causes the at least one processor to determine movement of the imaging unit in a lateral direction on the basis of a difference between the target image and the reference image, and set the correction amount to 0 when the movement in the lateral direction is determined.

5. The information processing apparatus according to claim 1, wherein
the at least one program causes the at least one processor to specify a distance to a target object corresponding to an object included in the target image on the basis of a height to the object in the target image and the correction amount.

6. An information processing method by an information processing apparatus including a camera that is fixed to a vehicle and a processing unit that performs image processing, the method comprising:
acquiring, by the camera, time-series images; and
generating, by the processing unit, a plurality of shifted images obtained by shifting a reference image acquired before a target image among the time-series images in an up-down direction by a plurality of types of different shift amounts, and specifying a correction amount by a pitch of the camera on the basis of a difference between each of the plurality of shifted images and the target image,
wherein the method further comprises:
enlarging, by the processing unit, the reference image on the basis of a time difference between capture of the reference image and capture of the target image and a moving velocity of the camera so that the angle of view of the target image region included in the reference image matches the angle of view of the target image.

* * * * *